(12) United States Patent
Schlanger

(10) Patent No.: US 6,428,437 B1
(45) Date of Patent: Aug. 6, 2002

(54) POWER TRANSMISSION ASSEMBLY

(76) Inventor: Raphael Schlanger, 128 Hulda Hill Rd., Wilton, CT (US) 06897

(*) Notice: Subject to any disclaimer, the term of this patent is extended or adjusted under 35 U.S.C. 154(b) by 0 days.

(21) Appl. No.: 09/590,973

(22) Filed: Jun. 9, 2000

Related U.S. Application Data

(60) Provisional application No. 60/138,475, filed on Jun. 10, 1999.

(51) Int. Cl.[7] ........................... F16H 55/12; F16H 55/30
(52) U.S. Cl. ....................................... 474/160
(58) Field of Search ................... 474/160, 161, 474/162; 29/512, 523; 280/259, 260, 261

(56) References Cited

U.S. PATENT DOCUMENTS

| | | |
|---|---|---|
| 3,013,440 A | 12/1961 | White |
| 3,199,364 A | 8/1965 | Dew |
| 3,605,513 A | 9/1971 | Sugimoto |
| 4,031,769 A * | 6/1977 | Kassing .................. 74/243 DR |
| 4,589,860 A | 5/1986 | Brandenstein et al. |
| 4,816,013 A * | 3/1989 | Kapela et al. ............... 474/160 |
| 5,194,051 A * | 3/1993 | Nagano ....................... 474/160 |
| 5,503,600 A | 4/1996 | Berecz |
| 5,852,951 A | 12/1998 | Santi |
| 5,935,034 A * | 8/1999 | Campagnolo ............... 474/160 |

\* cited by examiner

Primary Examiner—Thomas R. Hannon
Assistant Examiner—Timothy McAnulty
(74) Attorney, Agent, or Firm—Bachman & LaPointe, P.C.

(57) ABSTRACT

A power transmission element including an improved drive sprocket assembly with at least one preformed sprocket and a central sprocket carrier, wherein the sprocket teeth of the sprocket extend beyond the central sprocket carrier for mating with a roller chain, and wherein the sprocket is secured to the sprocket carrier via deformation of the sprocket carrier.

56 Claims, 9 Drawing Sheets

POWER TRANSMISSION ASSEMBLY

CROSS-REFERENCE TO RELATED APPLICATIONS

This application claims the benefit of Provisional Application Serial No. 60/138,475, filed Jun. 10, 1999, for SPROCKET ASSEMBLY, By Raphael Schlanger.

BACKGROUND OF THE INVENTION

The present invention relates to the arrangement wherein a power transmission element includes a preformed interface element that is joined to a carrier element via deformation of the carrier element. The preformed interface element includes a surface that contacts a mating external power transmission element. More specifically, this invention focuses on a preformed driving sprocket and a sprocket carrier element, wherein the sprocket carrier element, or portion thereof, is deformed to encapsulate or otherwise connect to a portion of the preformed driving sprocket. This invention is particularly adaptable to the sprocket cluster of a bicycle wheel where a multiplicity of sprockets may be captured within a common carrier or sprocket hub.

In general, it should be recognized that a mechanical drivetrain consists of a plurality of mechanical power transmission elements, including at least one initial input element and at least one final output element and often at least one intermediate element situated between the input and output elements. From the perspective of any individual power transmission element, power, or the motion associated with power, is input to this individual element via interaction at a mating interface with an external input element and motion is output to a mating external output element via a second mating interface. In some cases, motion may be output to a plurality of external output elements, including one external power transmission element and one auxiliary power transmission element. Often, the final output element of the drivetrain does not transmit motion to an external element since, by definition, the desired motion has been achieved.

For the past century, motive force for bicycles has been transmitted through the rear wheel via a drivetrain that includes a roller chain and sprocket transmission system. With the advent of the derailleur transmission, a variable driving ratio was created by selectively engaging the roller chain with any one of several axially spaced sprockets, all connected to the same hub. Current bicycle technology utilizes multiple sprockets on the driving axle, which is normally connected to the pedal crankshaft, as well as on the driven axle, which is normally connected to the rear wheel. Generally, the driven axle of the rear wheel includes a sprocket assembly with as many as nine sprockets, all connected to the same wheel hub. This wheel hub usually includes a freewheeling clutch to transmit driving torque only in the forward direction of rotation while slipping or freewheeling in the reverse direction.

The technology for the rear wheel sprocket assembly, has evolved over the years. Initially, the sprockets were fixed together to include the freewheeling clutch in one unit, called a "freewheel", which was then assembled to the hub of the rear wheel. While the "freewheel" is still in use today, the state-of-the-art drive mechanism includes an assembly whereby the clutch is incorporated into the rear hub of the bicycle wheel prior to attachment of the sprockets. Such an assembly is termed a "freehub". The clutch portion of the "freehub" is termed the "freehub body" and includes a splined outer shell over which the sprockets or sprocket assembly is assembled. The sprockets include splines on their inside diameter to mate with the splines of the freehub body, thereby transmitting driving torque from the sprocket to the wheel hub. The sprocket assembly, or "cassette", is then assembled to the freehub body, either as a series of individual sprockets and spacers or as a subassembly where the sprockets are first affixed to a carrier, which is then assembled over the splines of the freehub body. A lockring is used to secure the cassette to the freehub body.

Whether a freewheel or a freehub arrangement is used, the assembly is generally quite heavy due to the weight of the metal components that are usually fabricated from steel. In addition, the parts of the sprocket assembly are generally quite expansive since they are constructed from a relatively large number of individual metal components, each of which must be separately machined or cast and finally assembled together.

SUMMARY OF THE INVENTION

The present invention involves a power transmission element, including a separately formed sprocket portion that is affixed to a central carrier portion via the deformation of the carrier material. In a preferred embodiment of the present invention, the separately formed sprocket is affixed to a central carrier via solidification of fluent carrier material to engage or capture the sprocket. In manufacture of this preferred embodiment, at least one preformed sprocket is fixtured within a mold cavity such that a portion of the sprocket protrudes within the mold cavity. Subsequently, molten thermoplastic polymer is injection molded to fill the mold cavity and surround the protruding portion of the sprocket. Once the polymer cools and solidifies, the combined polymer/sprocket assembly is ejected from the mold, yielding a composite sprocket assembly with exposed metal sprocket teeth and a polymer central hub or carrier portion. During this molding process, the fluent carrier material may be considered to deform to encapsulate and capture the preformed sprocket.

Thus, the toothed sprocket perimeter, the portion of the sprocket that engages the drive chain, is left exposed and may be of sufficiently hard material to withstand the wear and contact stresses associated with the transmission of motive force between these two power transmission elements. Conversely, the central carrier or hub portion of the sprocket, which does not experience the same wear or contact stress, may be made from a softer or weaker material, such as polymeric material, that is preferably also lighter in weight and lower in cost. Fiber reinforced polymers and particle reinforced polymers are materials particularly suited in this application, since they are inexpensive, relatively strong, light in weight, easy to process and have good dimension control.

It is preferable that the carrier portion of the sprocket be wider than the sprocket thickness, as measured axially. This allows the softer teeth on the inside diameter of the carrier to contact the freehub body splines over a wider region, serving to distribute the contact forces between the sprocket hub and the freehub body over a wider area. As this area of contact is increased, the contact stress between the two components is reduced.

Further, the increased width of the sprocket hub may be sized such that, when the adjacent sprocket is assembled to the freehub body, the sprockets are stacked such that proper axial spacing is maintained between the adjacent sprockets. This eliminates the need for additional spacers between the sprockets.

A preferred embodiment focuses on encapsulation of one or more sprockets within a polymer hub such that the polymer material engages the sprocket(s) and transmits the torque to the axle or other components of the wheel hub. The greatest benefit is obtained when a plurality of axially spaced sprockets are encapsulated within a single carrier. Since the chain is engaged with only one sprocket at a given time, the driving torque may be transmitted across the full width of the carrier, distributing the load and reducing the stress within the polymer carrier material.

In addition, the carrier may now serve to retain a multiple of sprockets together, thus eliminating the need for individual spacers between the sprockets and reducing the number of separate parts that must be assembled or disassembled for servicing. In addition to the added convenience associated with reducing the number of parts, the cost is also reduced as parts are eliminated, as compared to the prior art assemblies. Since the carrier is now created in a single net-shape molding process, the multiplicity of forming and assembly operations associated with the individual components of the prior art assembly is reduced, reducing cost still further. Since the stresses due to torque transmission are now distributed over a larger portion of carrier material, stresses are reduced and lower strength carrier materials may be utilized. Such materials are usually also lower in cost.

Weight reduction is often a primary concern for performance-oriented cyclists. Since the present invention may utilize a carrier of lightweight polymer material and since the central opening of the preformed sprockets is larger, the overall volume of steel in the sprockets may be reduced, thereby providing a significant weight saving benefit.

Often the axial spacing distance between adjacent sprockets must be accurately controlled to insure optimal derailleur shifting performance from one sprocket to the next. Prior art cassette assemblies include a stackup of thickness tolerances among the multitude of individual sprocket and spacer components, making closely controlled spacing difficult and expensive to achieve. The present invention, on the other hand, uses a precision mold to precisely and repeatably locate the sprockets, resulting in greater spacing accuracy at a reduced cost.

The steel sprockets are most often blanked out of sheet metal in a profile stamping process. Since the present invention permits these sprockets to have a much larger central opening, the central blanked slug, which is normally wasted, is now large enough to be utilized to create a smaller sprocket. Thus, the same footprint of sheetmetal may yield two or more sprockets, reducing the raw material cost.

In the case where the polymer carrier material is prone to yielding or deformation at the interface with the freehub body splines, additional inserts may be added to distribute the contact stresses over a broader surface area of the polymer carrier. Such an insert may be encapsulated and retained within the carrier or it may be assembled between the freehub body and the sprocket carrier subsequent to molding.

Since the carrier is molded in a net-shape forming process, a wide variety of additional features may be incorporated within the carrier itself with little or no additional cost. Some of these features include shifting ramps, screw bosses and auxiliary components.

Further objects and advantages of my invention will become apparent from a consideration of the drawings and ensuing description.

BRIEF DESCRIPTION OF THE DRAWINGS

The present invention will be more readily understandable from a consideration of the accompanying drawings, wherein.

DETAILED DESCRIPTION OF PREFERRED EMBODIMENTS

Figure 1A:
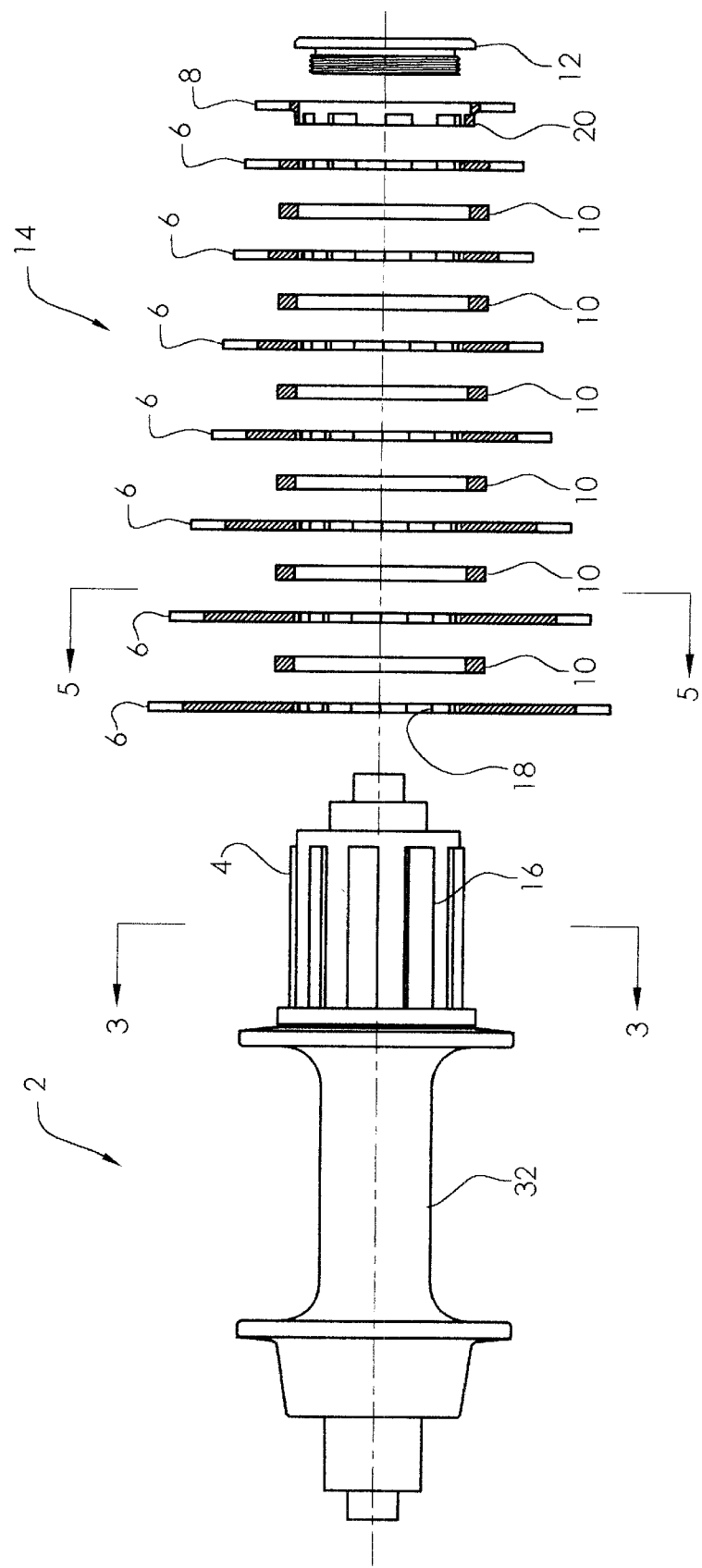
FIG. 1A shows the assembly of the freehub and associated prior art sprockets and spacers, with the sprockets and spacers shown in axial cross section.

The prior art freehub assembly is described in FIG. 1A, where the freehub 2 includes a wheel hub portion 32 and a freehub body 4, which includes axial splines 16 on its outer cylindrical surface. The individual sprockets 6 include splines 18 on their inside diameter. The sprockets 6 are slid over the freehub body 4 such that the spline 18 of the sprocket 6 engages with the spline 16 of the freehub body 4. This spline engagement permits effective torque transmission between the sprocket 6 and the freehub body 4. Spacers 10 are assembled between the sprockets 6 to provide the desired axial spacing or gap between adjacent sprockets 6 after assembly. The final sprocket 8 includes a flange 20, which acts to space this sprocket 8 from the previously assembled sprocket 6. The sprocket pack or cassette 14 is finally secured to the freehub body 4 via the locknut 12, which threads into the end of the freehub body.

Figure 1B:
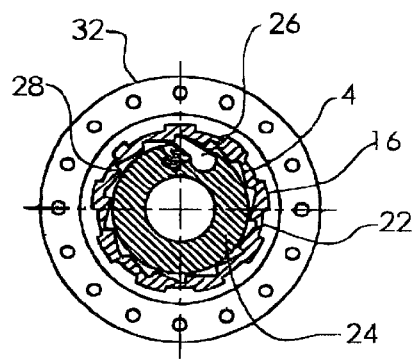
FIG. 1B is a cross section along line 3—3 of FIG. 1A of the prior art freehub body assembly.

The freehub body is described in greater detail in FIG. 1B where the freehub body 4 includes a freehub body shell 22 which has axial splines 16 on its outer cylindrical surface and ratchet teeth 28 on its inside surface. The pawl carrier 24 is fixed to the wheel hub 32. A spring-loaded ratchet pawl 26 pivots within the pawl carrier 24 and engages with the ratchet teeth 28, of the freehub body shell 22. The interface between ratchet teeth 28 and pawl 26 creates a blocking engagement in the driving direction of rotation and a slipping engagement in the non-driving direction of rotation. The freehub body shell 22 is thus rotatably fixed to the pawl carrier 24 in the driving direction of rotation and is allowed to freewheel or overrun in the opposite direction of rotation, thus creating the freewheeling clutch mechanism well known in industry.

Figure 1C:
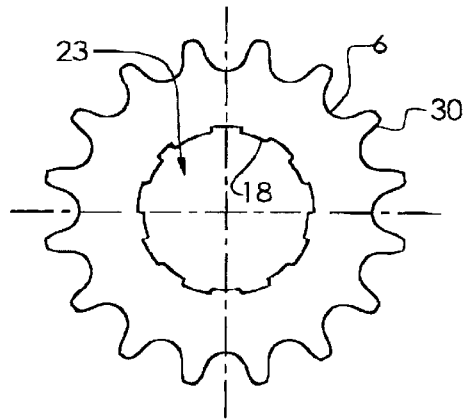
FIG. 1C is a plan view of a typical prior art sprocket of FIG. 1A as viewed along line 5—5 of FIG. 1A.

The sprocket 6 previously described is illustrated in plan view in FIG. 1C, including sprocket teeth 30 that engage with the roller chain (not shown). The sprocket 6 also includes splines 18 around its central opening 23, which engage with the mating splines 16 of the freehub body 4.

Figure 2:
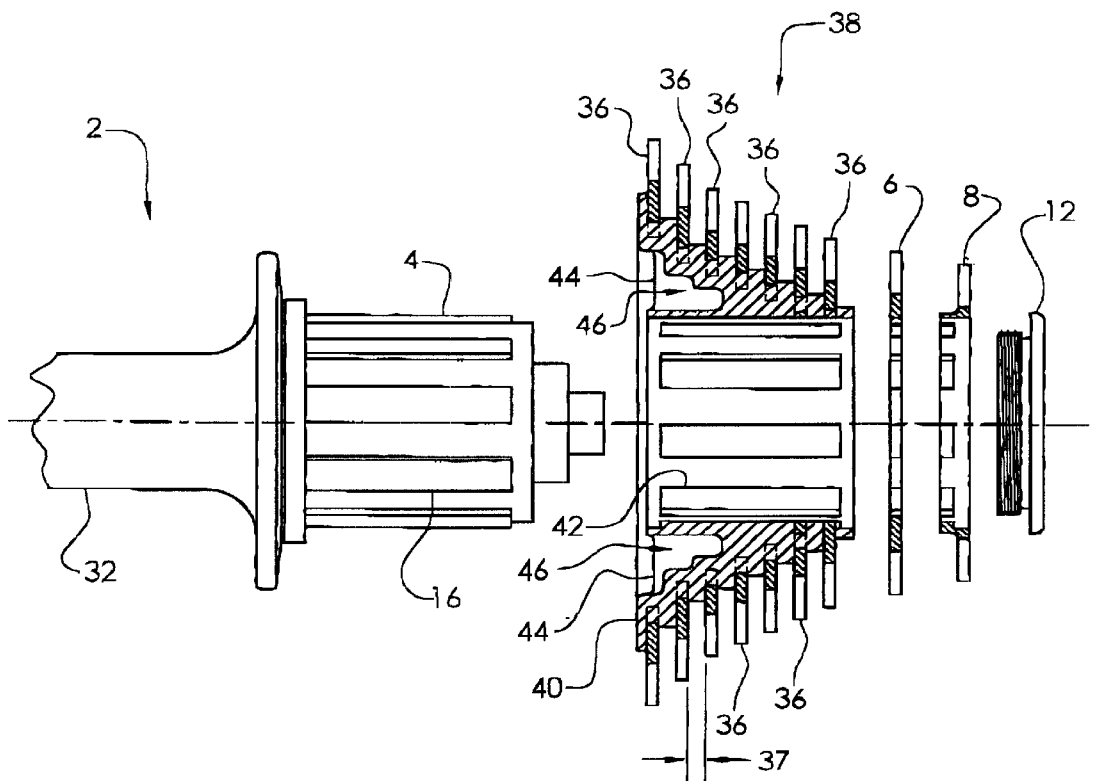
FIG. 2 shows an embodiment of the present invention in exploded assembly with the freehub, wherein the sprockets and carrier are shown in axial cross section.

FIG. 2 describes an embodiment of the present invention that utilizes a conventional freehub 2 with freehub body 4. A carrier assembly 38 includes sprockets 36, which are partially encapsulated within carrier 40 and are engaged therein. The carrier assembly 38 is thus an assembly of two materials: the sprocket 36 material and the carrier 40 material. The carrier 40 includes splines 42, which engage with the splines 16 of the freehub body 4. The carrier also includes hollowed-out regions 46 to aid in molding by maintaining uniform wall thickness, as well as to reduce the amount of material required. Ribs 44 span radially across the hollowed-out region 46 to reinforce and support these open areas. This carrier 40 serves to capture and retain a multiple of sprockets 36, thereby eliminating the number of loose sprockets and spacers previously described in FIG. 1A. Additional sprockets 6 and 8 as well as locknut 12, similar to those described in FIG. 1A, may be incorporated in the assembly as well.

Note that the axial length of splines 42 are shown to be significantly longer than the axial length of the corresponding spline 18 of the individual sprockets 6 of FIG. 1A. This increased spline 42 length serves to create an increased engagement surface area with splines 16 of the freehub body 4. Driving torque is applied to the sprockets 36 and transmitted to the freehub body 4 via splines 42 and 16, resulting in contact stresses at this spline interface. Increasing the engagement length, and corresponding surface area, serves to reduce contact stress at the spline interface. Thus, the strength requirements of the carrier 40 are proportionately reduced, allowing the carrier 40 to be made from a lower strength material such as polymers, reinforced polymers or lightweight metals such as magnesium. Additionally, the carrier 40 serves to maintain an accurately controlled gap 37 between adjacent sprockets.

In this embodiment, as well as many others described herein, the carrier assembly 38 may be created in an insert molding process, where the sprockets 36 are first fixtured within a mold cavity such that a portion of the sprocket protrudes within the mold cavity. Molten carrier 40 material is then injected into the mold cavity, where it flows to surround the protruding portions of the sprockets. When the molten carrier material has cooled and solidified, the sprockets 36 are partially encapsulated and locked within the carrier 40 material. A firm connection is now achieved between the sprocket 36 and the carrier 40. While materials that are softened via heat, such as thermoplastic polymers and metals, may be utilized in this process, thermosetting materials may alternatively be substituted. Thermosetting materials, such as epoxy, phenolic, etc., are solidified via chemical reaction. Such an insert molding process is well known in industry. Thus, the sprocket carrier assembly may be produced in a single net-shape molding operation, thereby eliminating the machining and multiple part forming operations associated with the prior art.

While FIG. 2 describes a multiple of sprockets 36 encapsulated within a single carrier 40, it is envisioned that such an encapsulating carrier may be associated with only a single sprocket. In this case, the carrier would still preferably be wider than the sprocket thickness to distribute contact forces associated with engagement with the freehub body shell as described above. Further, the additional carrier width may be sized to provide the desired sprocket gap 37 in the case where multiple sprockets are stacked together. With the sprockets 36 engaged within the solidified carrier 40, this carrier assembly 38 may then be assembled to the freehub body shell 4 in the conventional manner.

Figure 3A:
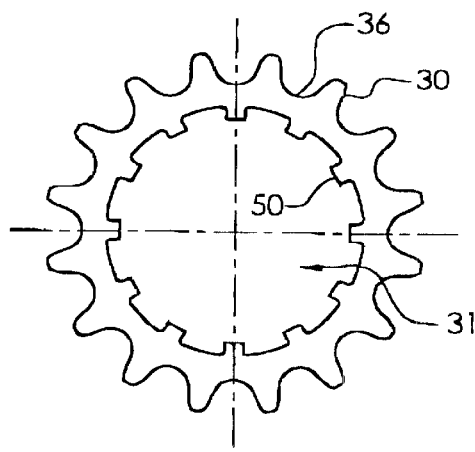
FIG. 3A is a plan view of a sprocket of the present invention.
Figure 3B:
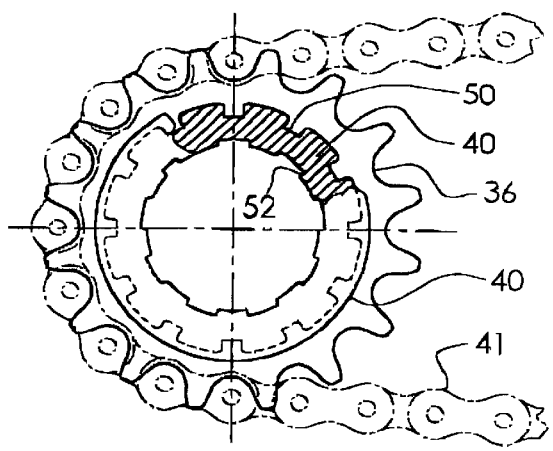
FIG. 3B is a plan view of the sprocket of FIG. 3A, including roller chain and carrier material, with the carrier material shown in partial section.

While the encapsulating carrier 40 material may adhere itself to the sprocket 36 with sufficient strength to effectively transmit torque between the sprocket 36 and carrier 40, it is often beneficial for the sprocket 36 to include a mechanical engagement with the encapsulating carrier 40. This mechanical engagement serves to augment the connection for greater torque transmission capacity. Thus, it is desirable for the sprocket 36 to include discontinuous geometry or a configured surface such as splines 50 within the encapsulated region of the sprocket 36. This is well illustrated in FIGS. 3A and 3B. FIG. 3A shows the splines 50 incorporated within the central opening 31 of the sprocket 36 prior to being encapsulated by the carrier 40. FIG. 3B shows the sprocket of FIG. 3A as encapsulated within the carrier 40. The splines 50 are encapsulated and engaged within the carrier 40 material and the carrier 40 is molded to include splines 52 to engage with the splines 16 of the freehub body 4. The outer perimeter of sprocket 36, including sprocket teeth 30, are exposed outside of the carrier 40 to mate with the roller chain 41. Thus, driving torque is transmitted from the sprocket 36 to the carrier 40 via splines 50. This torque is further transmitted to the freehub body shell via splines 52.

Figure 4A:
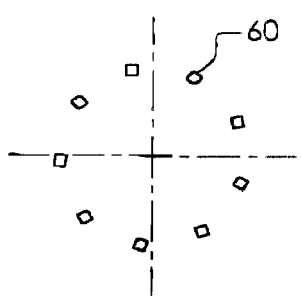
FIG. 4A is a plan view of inserts of an alternate embodiment of the present invention.
Figure 4B:
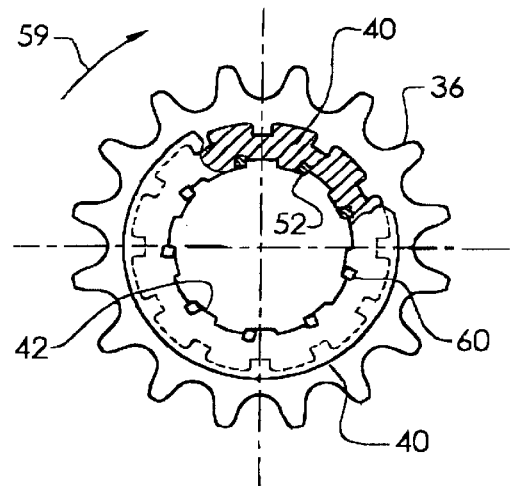
FIG. 4B is a plan view of the sprocket of FIG. 3A and the inserts of FIG. 4A, including carrier material and inserts shown in partial section.

Since the carrier is preferably molded of polymer material, which is a relatively soft material, there may be some concern that the splines 52 of the carrier may, due to heavy application of driving torque and due to stress on the carrier 40, deform in their engagement with the splines 16 of the freehub body 4. To reduce the deformation and distribute this torque over a broader area of the spline 52, an insert of harder material may be utilized in conjunction with the carrier. While such a preformed insert may be a completely separate component, it may be desirable to encapsulate the insert within the carrier itself. Thus, both the inserts(s) and the sprocket(s) may be encapsulated in the same molding operation. Such an example is illustrated in FIGS. 4A and 4B where a series of inserts 60 are encapsulated within the carrier 40 material. These inserts 60 are preformed of hard material to effectively distribute the contact stresses between the splines 42 of the carrier 40 and the splines 16 of the freehub body 4 over a wider area of the carrier 40 material. These inserts 60 serve to further reduce the contact stress within the carrier 40 material. FIG. 4A shows the inserts 60 in end view prior to being encapsulated by the carrier 40 material. It is advantageous that these inserts 60 extend axially over the length of the spline 42 engagement of the carrier 40. The inserts 60 are shown in FIG. 4B to be encapsulated within the carrier 40 material and are located to bear against the mating spline 16 of the freehub body 4 when the sprocket 36 is rotated in the driving direction 59. No insert is shown to bear against the spline 16 in the freewheeling direction since such freewheeling torque is, by definition, quite low.

Figure 5A:
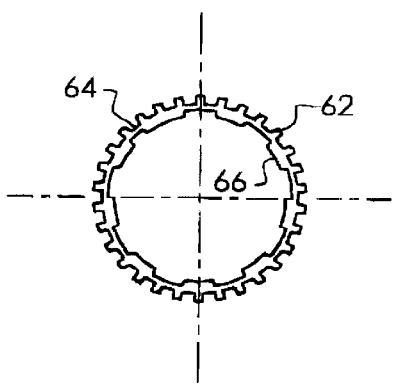
FIG. 5A shows an alternate embodiment of the present invention, in plan view and including an insert.
Figure 5B:
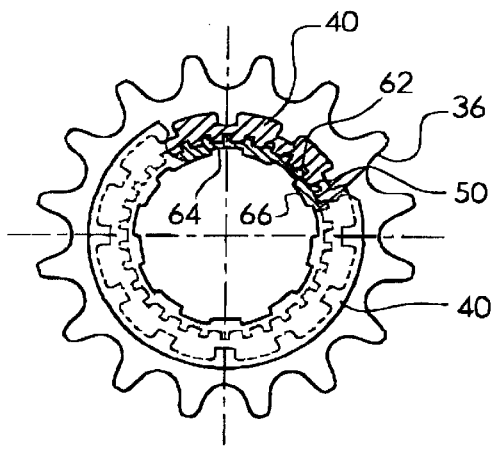
FIG. 5B is a plan view of the sprocket of FIG. 3A and the insert of FIG. 5A, including carrier material and insert shown in partial section.

FIGS. 5A and 5B illustrate an embodiment similar to FIGS. 4A and 4B, however, in these figures, the insert 64 is a continuous one that circumscribes and surrounds the freehub body 4 and includes splines 66 which mate with splines 16 of the freehub body. The insert 64 also includes projections 62, which engage with the carrier 40. Again, while such an insert 64 may be a separate component, it may be desirable to encapsulate the insert within the carrier itself. This insert 64 is preformed out of a hard material to effectively distribute the contact forces, due to driving torque, over a greater area of the carrier 40 material. FIG. 5A shows the insert 64 in end view prior to being encapsulated by the carrier 40 material. Although such an insert 64 may be effective with a relatively short length of engagement, it is more advantageous that this insert 64 extends axially over the length of the spline 16 engagement. FIG. 5B shows the insert 64 encapsulated within the carrier 40 along with the sprocket 36. Thus the sprocket 36 is engaged with the insert 64 via the encapsulating carrier 40 material. The splines 50 of the sprocket 36 and the splines 62 of the insert 64 serve to provide mechanical engagement with the carrier 40 material for effective transmission of torque between the sprocket 36 and the freehub body 4.

Figure 6A:
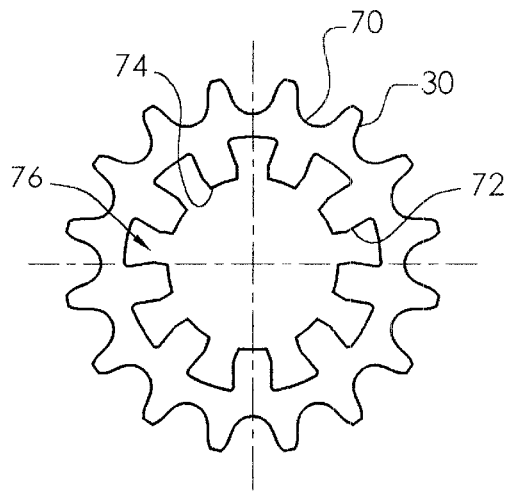
FIG. 6A is a plan view of a sprocket of an alternate embodiment of the present invention.
Figure 6B:
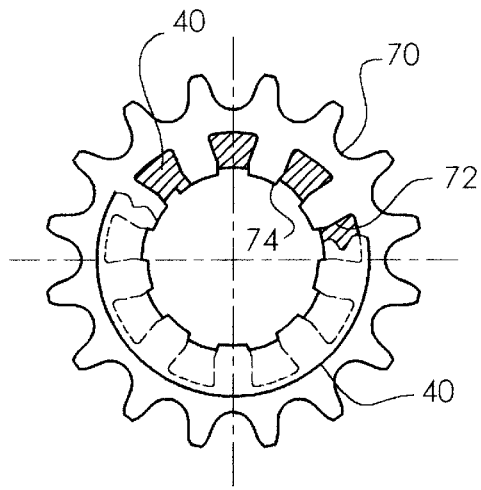
FIG. 6B is a plan view of the sprocket of FIG. 6A, including carrier material shown in partial section.

The sprocket may include a portion that extends through the carrier 40 to be directly coupled to the spline 16 of the freehub body 4. Such an example is illustrated in FIGS. 6A and 6B where the sprocket 70 includes extensions 72 which extend to include spline portions 74. These spline portions 74 are mated to engage with the splines 16 of the freehub body 4. FIG. 6A shows the sprocket 70 prior to being encapsulated by the carrier 40 material. The sprocket 70 includes open portions 76 between the extensions 72. The encapsulating carrier 40 material is allowed to flow through the open portions 76 during molding and thereby encapsulating and engaging the sprocket 70 upon subsequent solidification of the carrier 40 material. This is illustrated in FIG. 6B, which shows the sprocket 70 subsequent to encapsulation by the carrier 40 material. In this embodiment, the sprocket 70 bears directly on the splines 16 of the freehub body 4. Thus, there is far less torque transmitted between this sprocket 70 and the carrier 40, whereby the carrier serves merely to retain and locate the sprocket 70. While opening 76 is exposed at the inside diameter of sprocket 70, it is also envisioned that through holes may be substituted for opening 76. Carrier material may pass through the through holes during molding to serve the same function as openings 76.

Figures 7A, 7B:
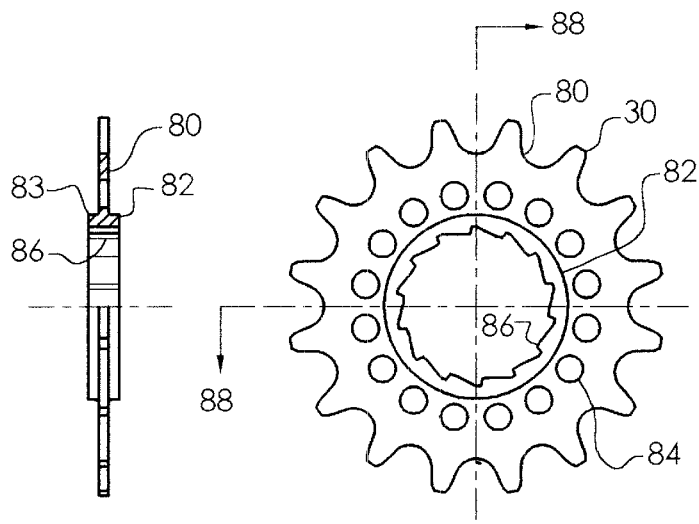
FIG. 7A is an axial section view of a sprocket of an alternate embodiment of the present invention, taken along line 88—88 of FIG. 7B.
FIG. 7B is a plan view of the sprocket of the FIG. 7A.
Figure 7C:
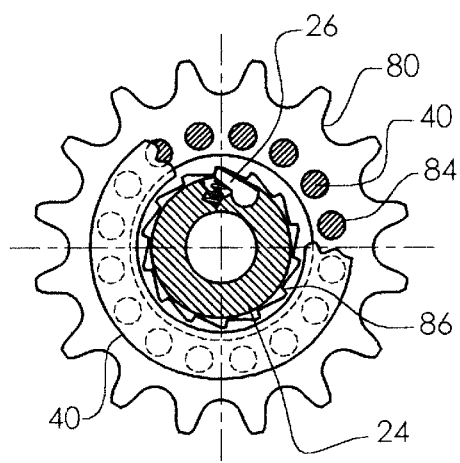
FIG. 7C is a plan view of the sprocket of FIG. 7A, including carrier material shown in partial section and a portion of the freehub assembly shown in cross section.

The previous figures have all illustrated a carrier assembly 38, which mates with the exterior of a freehub body shell 4. However, it is envisioned that the sprocket may pass completely through the carrier such that a portion of the sprocket or insert is also exposed at the central opening of the carrier. Based on this, at least a portion of the freehub body shell 22 may be incorporated within the carrier 40 as well. Thus, the freehub body shell, or a portion thereof, may be incorporated within the carrier assembly, further reducing the total number of parts involved. Such an example is illustrated in FIGS. 7A, 7B, and 7C where the sprocket 80 includes the ratchet teeth 86 on its inside diameter. The sprocket 80 also includes openings 84, allowing the encapsulating carrier 40 material to flow through to encapsulate and capture the sprocket 80. Thus, the sprocket 80 may be encapsulated such that the ratchet teeth 86 are left exposed to mate with the ratchet pawl 26 in the manner previously described in FIG. 1B. The sprocket 80 is now directly linked to the ratchet pawl 26 and a freewheeling clutch mechanism is achieved. FIG. 7A shows the sprocket 80, prior to assembly with the carrier 40, in side view in partial section along line 88—88, showing additional flanges 82 and 83, which add width to the ratchet teeth 86 for greater contact area with the ratchet pawl 26. FIG. 7B shows the sprocket 80 of FIG. 7A in plan view. FIG. 7C shows the sprocket 80 as assembled within the carrier 40, including carrier 40 material within the openings 84. Also included in this figure are the ratchet pawl 26 and the pawl carrier 24 as described in FIG. 1B pawl 26 and a freewheeling clutch mechanism is achieved. FIG. 7A shows the sprocket, prior to assembly with the carrier 40, in side view in partial section along line 88—88, showing additional flanges 82 and 83, which add width to the ratchet teeth 86 for greater contact area with the ratchet pawl 26. FIG. 7B shows the sprocket 80 of FIG. 7A in plan view. FIG. 7C shows the sprocket 80 as assembled within the carrier 40, including carrier 40 material within the openings 84. Also included in this figure are the ratchet pawl 26 and the pawl carrier 24 as described in FIG. 1B.

Figure 8A:
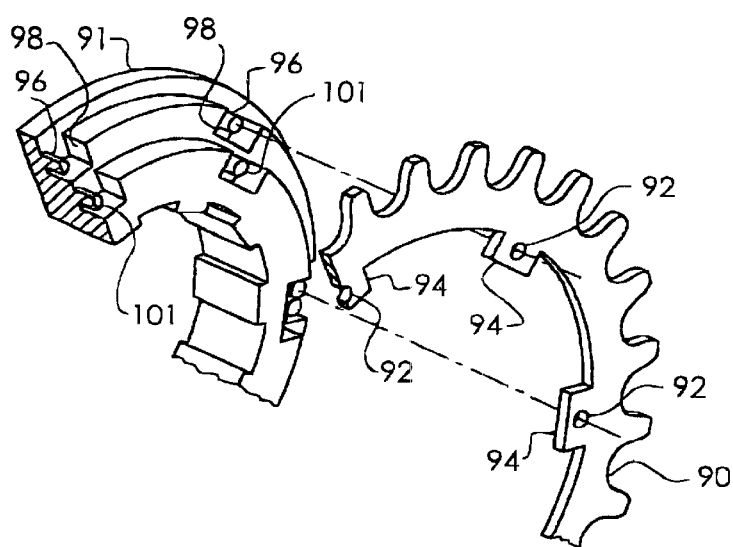
FIG. 8A is a partial isometric exploded view of an alternate embodiment of the present invention, with the axial cross section shown.
Figure 8B:
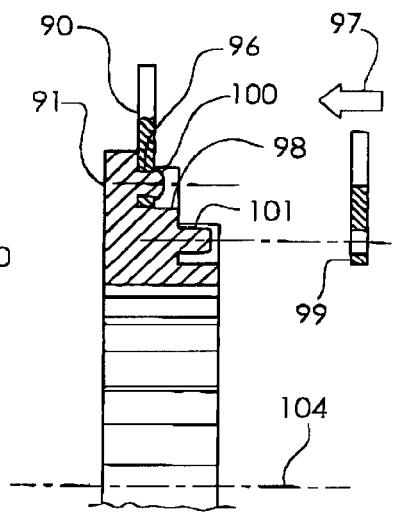
FIG. 8B is a partial axial cross section view of the embodiment of FIG. 8A, including an additional sprocket shown in exploded view.

While the previous figures have described an assembly where the carrier 40 material is liquefied to flow and circumfuse around a portion of the sprocket(s) in an insert molding type of process, it is also envisioned that a localized portion of the carrier may be deformed in a controlled manner to capture and retain the sprocket 90. An example of this is described in FIGS. 8A and 8B, where the sprocket 90 is assembled to a preformed carrier 91 such that pins 96 of carrier 91 pass through sprocket openings 92 of sprocket 90. The tip portion of the carrier pin 96 protrudes beyond the surface of the sprocket 90 upon assembly. This protruding portion of the carrier pin 96 is deformed and mushroomed with heat and pressure such that mushroomed head 100 creates an overlie engagement wherein the sprocket 90 is trapped under the head of the mushroom 100 as described in FIG. 8B. Additionally, upon assembly, the tabs 94 of the sprocket 90 also engage with mating pockets 98 in the carrier 40 to increase the torque transmission capacity between the sprocket 90 and the carrier 91. As shown in FIG. 8B, a second sprocket 99 may be assembled to carrier 91 in the direction of arrow 97 and then fastened to the carrier in the same manner by deforming pins 101. The assembly rotates about rotational axis 104.

The above-mentioned deformation of the carrier 91 material may be achieved by locally softening and deforming the carrier 91 material such that the sprocket is retained with the carrier upon the subsequent hardening of the carrier 91 material. One well known process for achieving such localized softening or melting is ultrasonic welding, whereby mechanical energy is transferred to the carrier material, creating heat to soften the carrier 91 material. Some other candidate processes include heat staking, vibration welding, friction welding, cold-forming, etc. All of these processes are particularly applicable to thermoplastic polymer as the carrier material, but some of these processes have been applied to metals and thermosets as well.

Figure 9:
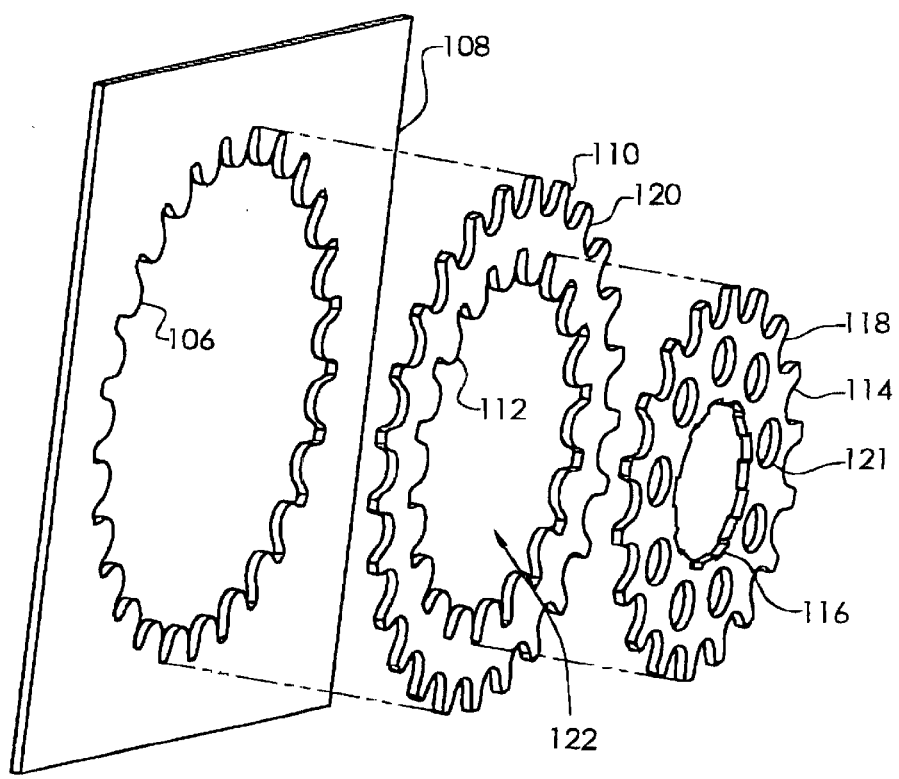
FIG. 9 is an isometric exploded view of sprockets of an alternate embodiment of the present invention.

Since the sprocket 6 of FIG. 1C is directly coupled to the freehub body shell 4, the central opening 23 must be of a relatively small diameter to fit directly with the freehub body 4. However, if a carrier 40 is included in the assembly, the central opening 31 of the sprocket 36, as shown in FIG. 3A, may be much larger. This allows the volume of the heavier sprocket 36 material to be minimized in an effort to reduce weight. As illustrated in FIG. 9, the steel sprockets are most often blanked out of sheet metal 108 in a profile stamping process, with the blanked opening profile 106 in sheet metal 108 corresponding to the outer perimeter sprocket profile 110 of the first sprocket 120. Since the present invention has the potential for a larger central opening 122, the waste sheet material formed from punching out the central opening 122 of the first sprocket 120 may now be large enough to produce the outer profile 114 of a second smaller sprocket 118. Thus, where formerly only a single sprocket 6 may be formed from a single sheet metal blank, now two or more sprockets may be produced from the same amount of raw material, thereby reducing raw material cost. The profile of the larger central opening 122 of the first sprocket 120 may be shaped to include splines 50 as shown in FIG. 3A. In such a case, the associated waste material must then be blanked a second time to achieve the proper sprocket tooth profile 114 on the outer perimeter of the second sprocket 118. Alternatively, as described in FIG. 9, a first sprocket 120 is blanked from sheet metal 108. The blanked central opening 112 in first sprocket 120 corresponds to the outer perimeter sprocket profile 114 of the second sprocket 118. Thus, the blanked central opening 112 is shaped in a negative sprocket profile, which may be substituted for the splined opening 31 of FIG. 3A. The advantage to the arrangement illustrated in FIG. 9 is that an additional blanking operation is not required to form the sprocket tooth profile 114, thereby eliminating the expense associated with the additional blanking operation. Depending on the desired configuration, the second sprocket 118 may then be blanked to achieve splined opening 116 and openings 121.

Figure 10:
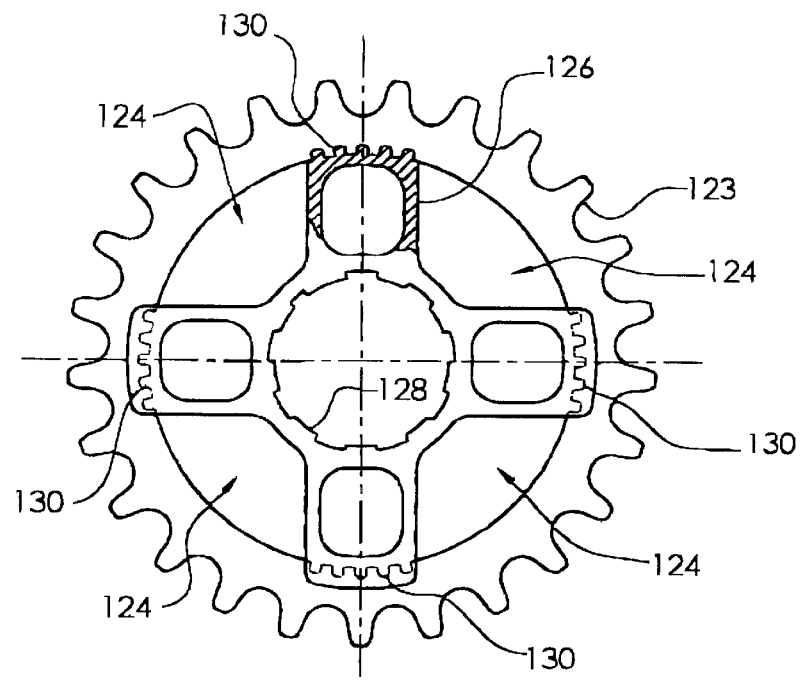
FIG. 10 is a plan view of an alternate embodiment of the present invention, including a sprocket with carrier material shown in partial section.

While FIG. 3B describes an embodiment where the encapsulating carrier 40 material contacts the sprocket 36 around the full perimeter of its central opening 31, it is also envisioned that, in some instances, such continuous circumferential contact may not be required or may not be advantageous. FIG. 10 describes an embodiment wherein the carrier 126 with internal splines 128 contacts the sprocket 123 at four separate circumferentially spaced engagement locations 130. The region between engagement locations 130, provide radial access to openings 124. These openings 124 provide two advantages. Firstly, since the sprockets are normally exposed to the outdoor environment, it is a common occurrence for debris to become lodged within the teeth and gaps 37 of the cassette 38 of FIG. 2, reducing shifting and drive performance. The openings 124, shown in FIG. 10, provide a path to permit this debris to fall in the gap 37 between adjacent sprockets, thereby creating a self-cleaning feature. The debris may then migrate toward the end of the cassette assembly through openings 124, and be ejected back to the environment. Secondly, these separated engagement locations 130 and openings 124 may result in a reduction in carrier 126 material, saving both weight and cost. It should be noted that FIG. 10 shows only a single sprocket 123 as joined to carrier 126, however this type of arrangement is readily applicable to multi-sprocket applications similar to the embodiment of FIG. 2.

Figure 11:
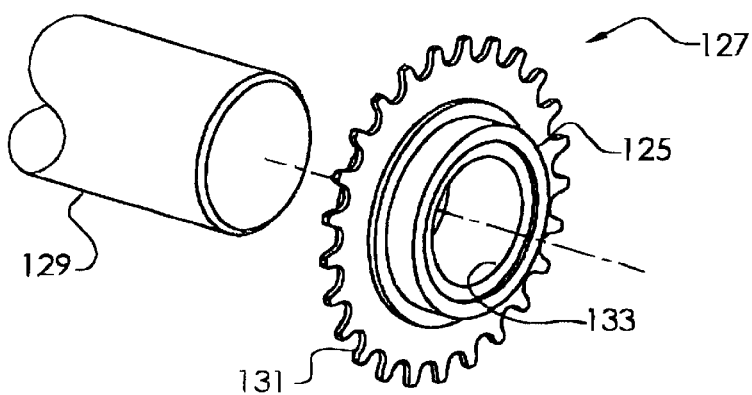
FIG. 11 is an isometric exploded view of an alternate embodiment of the present invention, including a sprocket assembly and shaft.

All of the previous embodiments focus on the condition where the interface between the sprocket and the carrier must be capable of transmitting a significant amount of torque. However, as shown in FIG. 11, such an encapsulating carrier approach may be applied to an idler sprocket assembly 127, which does not carry appreciable torque. As shown in FIG. 11, the carrier 125 is fixed to the sprocket 131 in the manner previously described. A bearing 133 may be fitted to the inside diameter of the carrier 125. Thus, the idler sprocket assembly 127 may be assembled to a shaft 129 such that the bearing 133 provides free rotation of the idler sprocket assembly 127 over the shaft. Note also, due to the inherent lubricity of some candidate carrier 125 materials (nylon, for example), the bearing 133 may be eliminated, allowing the carrier 125 to run directly on the shaft 129.

Figure 12:
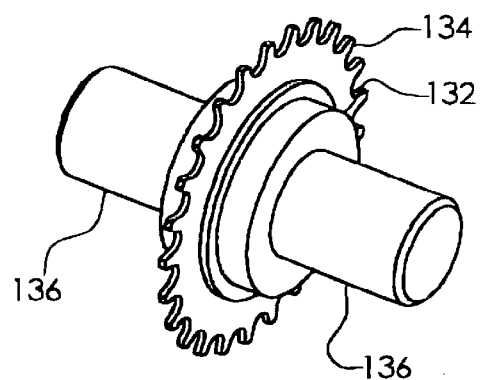
FIG. 12 is an isometric view of an alternate embodiment of the present invention, including an axle portion.

FIG. 12 describes an embodiment where the carrier 132 is fixed to the sprocket 134 in a manner previously described. However, in this figure, the carrier 132 includes an extension or axle portion 136 extending axially therefrom. The axle portion 136 may be integral with the carrier 132 and formed during the same molding process. Alternatively, the axle portion 136 may be separately formed and either assembled to the carrier 132 or insert molded within the carrier 132. While the axle portion 136 shown here extends axially from both faces of the sprocket, a single stub-axle arrangement may be substituted where an axle portion extends from only one face of the sprocket 134. The axle portion may then be located by bearings in a stationary member or may include an interface with an auxiliary power transmission element.

Figure 13A:
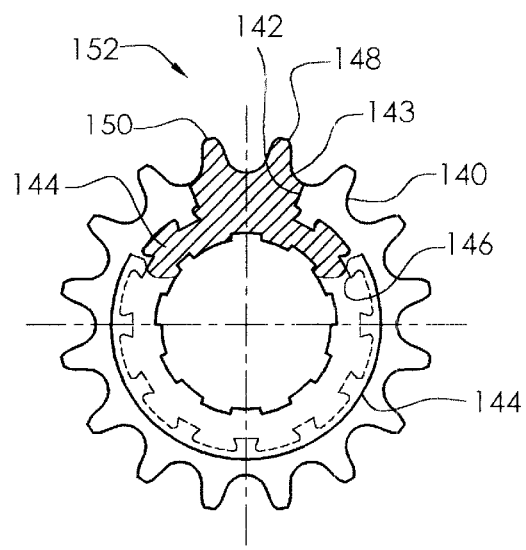
FIG. 13A is a plan view of an alternate embodiment of the present invention, including a sprocket with carrier material shown in partial section.

FIG. 13A describes an embodiment similar to FIG. 3A, however the preformed sprocket 140 of this figure does not fully circumscribe the carrier 144. Instead, the sprocket 140 includes a discontinuous circumference or gap 142. Thus, sprocket teeth 148 and 150 are not included in sprocket 140, but are instead formed from a sector 143 of carrier 144 material to complete the full circumference of sprocket 152 teeth. While this figure shows only a single gap 142 in the sprocket 140, it is envisioned that sprocket 152 may be made up of a multiplicity of individual preformed sprocket sectors, including multiple gaps between such preformed sectors. Further, while the preformed sprocket 140 is shown to be discontinuous across gap 142, it is also envisioned that a web of preformed sprocket 140 material may be included to bridge this gap sector to provide greater strength while still including sector 143 of carrier material.

Figure 13B:
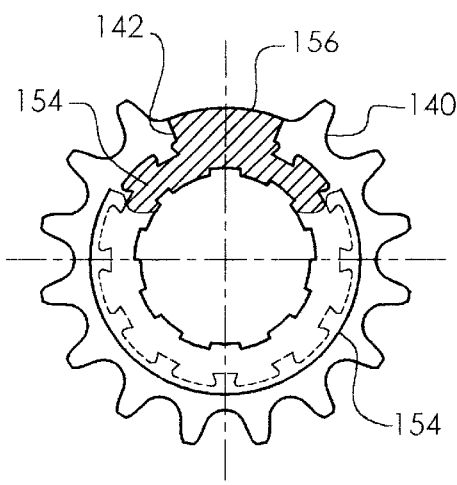
FIG. 13B is a plan view of an alternate embodiment of the present invention, including a sprocket with carrier material shown in partial section.

FIG. 13B describes an embodiment very similar to FIG. 13A, however, in this figure, teeth 148 and 150 are eliminated. Gap 142 in preformed sprocket 140 is filled with carrier 154 material and includes a smooth perimeter sector 156 without any driving sprocket teeth. The outside diameter of the perimeter sector 156 in this figure corresponds to the root diameter of the sprocket 140. Since the perimeter sector 156 is formed from carrier 154 material, which may not be as strong as the preformed sprocket 140 material, the teeth 148 and 150 of FIG. 13A may be omitted, since they would provide only marginal benefit. Further, in cases where the roller chain (not shown) must be derailed from one sprocket to its axially spaced neighbor, as is common in derailleur bicycle transmissions, such a smooth perimeter sector 156 may be advantageous in providing an opening gap for the chain to shift from one sprocket to the other. Further, there are many circumstances where discontinuous teeth are advantageous. For example, in the case where a preformed perimeter element includes gear teeth, such missing teeth may provide intermittent motion in the mating gear.

Figure 13C:
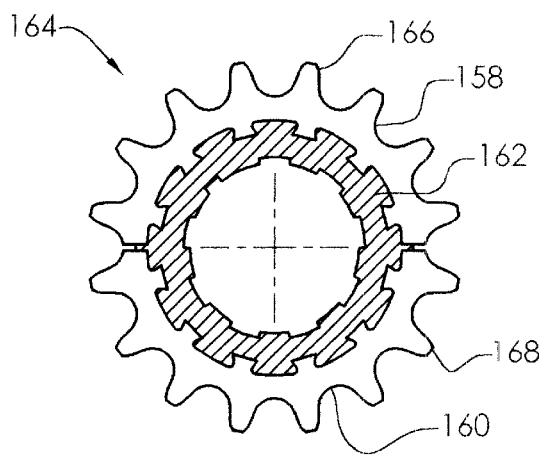
FIG. 13C is a plan view of an alternate embodiment of the present invention, including sprocket sectors with carrier material shown in cross section.

In FIG. 13C, a multiplicity of preformed sprocket sectors 158 and 160 may be assembled to create the full circumference of sprocket 164 teeth. In such a case, sector 158 includes sprocket teeth 166 and sector 160 includes sprocket teeth 168 such that teeth 166 and teeth 168 combine to form a full circumference of preformed sprocket teeth 164. Sectors 158 and 160 are both encapsulated within carrier 162 material and thus are firmly connected to each other and to the carrier 162.

Figure 14:
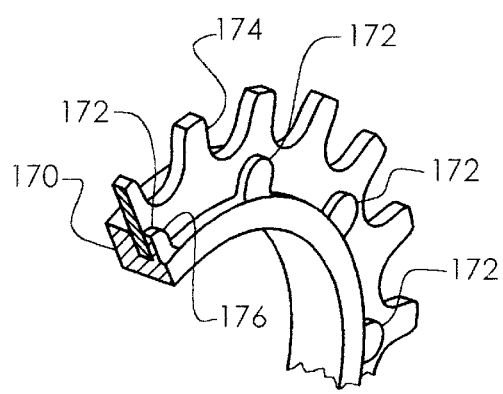
FIG. 14 is a partial isometric view of an alternate embodiment of the present invention, with the axial cross section shown.

In bicycle derailleur transmission applications, it is common to form the individual sprockets to include teeth of different thicknesses as well as edges, ramps, bevels and other features to aid in shifting the roller chain (not shown) from one axially spaced sprocket to another. With the current state of the art, the individual sprockets are formed from sheet metal in a blanking operation to achieve the sprocket profile and a coining operation to achieve the above mentioned thickness variations. This can be limiting, since the thickness variations are restricted to the starting thickness of the sheet metal. Since the carrier of the present invention is formed adjacent the sprockets, these edges and ramps and thickness variations may be formed as part of the carrier. This is illustrated in FIG. 14, where the carrier 170 includes extensions 172 formed adjacent to sprocket 174. Thus the edge 176 of extension 172 may be used to hook the roller chain as it is shifted axially, boosting the chain as it is shifted from one sprocket to the next. While the above-mentioned extension is particularly suited to bicycle derailleur applications, there are numerous other applications in industry where variations in carrier geometry may be advantageous. For example, a cam profile or an eccentric bushing may be formed within the carrier to transmit a wide variety of auxiliary motion in addition to the rotary power transmission provided by the sprocket or gear, etc.

Figure 15:
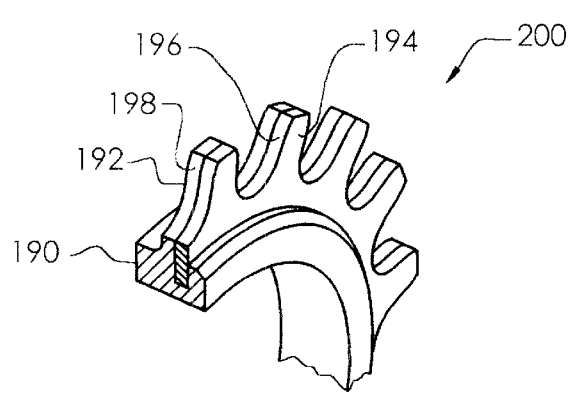
FIG. 15 is a partial isometric view of an alternate embodiment of the present invention, with the axial cross section shown.

FIG. 15 describes an embodiment where the carrier 190 includes an integrally formed extension 192 that extends alongside the sprocket 194 and includes an outer sprocket tooth profile 198 that corresponds to sprocket tooth profile 196 of sprocket 194. Thus, sprocket 200 is formed by the sandwiched lamination of carrier extension 192 and sprocket 194. While only a single lamination each of extension 192 material and sprocket 194 material is shown in this figure, it is envisioned that additional such laminations may be incorporated to form sprocket 200.

This type of arrangement may provide several benefits. First, weight may be saved, since the sprocket 194 is likely of denser material than carrier 190 material, sprocket 194 may be made thinner to save weight, while the extension 192, of carrier 190, may provide the additional sprocket 200 thickness. Second, the softer carrier 190 material may have sound deadening qualities, as compared to the harder sprocket 194 material. Thus, a laminated sprocket 200 of this type may be produced to provide a reduction in noise and vibration as the roller chain (not shown) passes over the sprocket 200. Third, this type of arrangement may be employed to reduce backlash in mating the sprocket 200 with the roller chain (not shown). In the case where the carrier 190 material is softer and more flexible than the sprocket 194 material, the extension profile 198 of extension 192 may be designed to be slightly larger and extending slightly beyond the sprocket profile 196. This way, the softer extension profile 198 is deformed in mating with the roller chain up to the point where the chain bears on the harder sprocket profile 196. With the larger extension profile 198 pressed between the rollers of the chain, the space between these rollers is completely filled, with each sprocket 200 tooth contacting both adjacent rollers. The result is a reduction or elimination of backlash due to the yieldable extension 192 material. Such a backlash reduction arrangement is particularly applicable to gear cogs, since this is the application where backlash problems are most prevalent.

Figure 16:
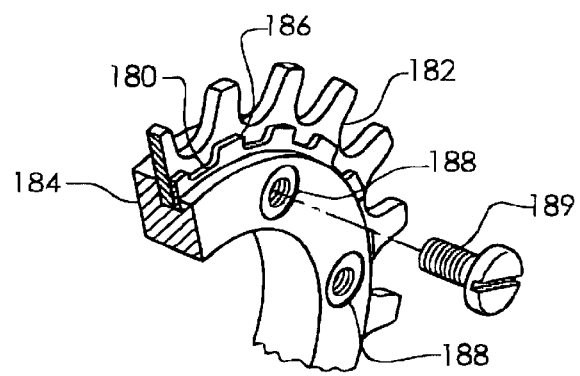
FIG. 16 is a partial isometric exploded view of an alternate embodiment of the present invention, with the axial cross section shown.

While the carrier may be formed to include extensions 172 or other features as mentioned above, additional preformed components may be included in the assembly to achieve these goals as well. As shown in FIG. 16, plate 180 is encapsulated within carrier 184 alongside the sprocket 182. Plate 180 includes extensions 186, which aid in shifting in a manner similar to extensions 172 in FIG. 14. Since plate 180 may be preformed from sheetmetal or other hard material, extension 186 has the potential to be stronger and more durable than extension 172 of FIG. 14. Such additional preformed components may include components of a wide variety of forms and materials. In one such an example, also illustrated in FIG. 16, carrier 184 includes a preformed threaded insert 188 to accept screw 189. Thus it may be seen that all manner of preformed components, in addition to the sprocket, may be included and captured within the carrier material. Further, it is envisioned that such an additional preformed component may be located within the carrier to provide reinforcement to the assembly. For example, an annular insert may be incorporated to provide hoop strength reinforcement.

Figure 17A:
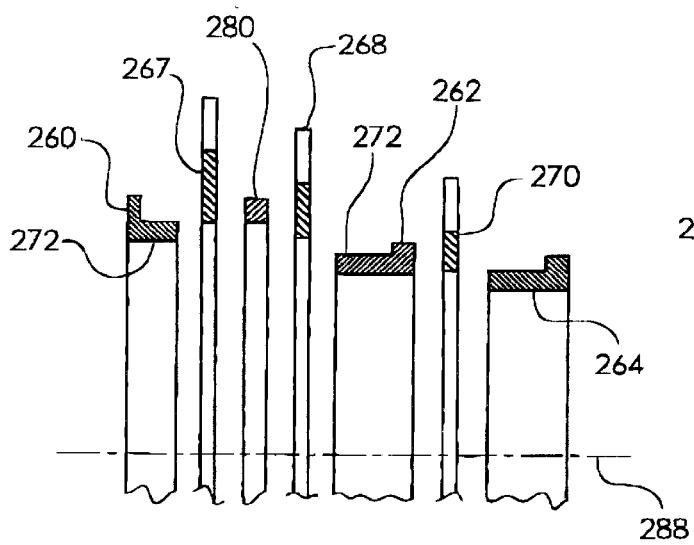
FIG. 17A is a partial exploded view of an alternate embodiment of the present invention, prior to assembly, shown in axial cross section.
Figure 17B:
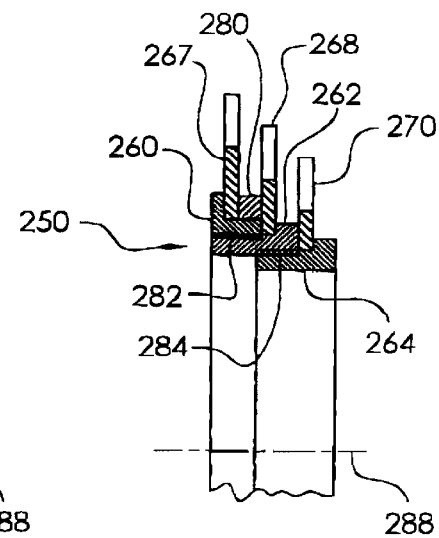
FIG. 17B is a partial axial cross section view of the embodiment of FIG. 17A, shown as assembled.

FIGS. 17A and 17B describe an embodiment wherein the carrier 250 is constructed from several preformed segments 260, 262 and 264 that are subsequently joined to each other to retain the sprockets 267, 268 and 270. FIG. 17A is an exploded view, including rotary axis 288, and showing the order in which the carrier segments 260, 262 and 264, spacer 280 and sprockets 267, 268, 270 are assembled. FIG. 17B shows the completed assembly of FIG. 17A. It is preferred that the carrier segments 260, 262 and 264 be preformed of thermoplastic polymer and that the assembly is achieved using the ultrasonic welding process, although other materials and assembly processes may be utilized. Prior to assembly, the inside diameter 272 of segment 260 is sized to be smaller than the outside diameter 272 of segment 262, creating an interference fit. Segments 260 and 262 may then be ultrasonically welded together so that the interference fit is temporarily melted, creating what is commonly referred to as a shear weld joint. Segments 260 and 262 are ultrasonically welded together at interface 282 to capture sprockets 267, 268 and spacer 280 as shown in FIG. 17B. Segment 264 is subsequently welded to the previous assembly at interface 284 to capture sprocket 270. Additional segments may then each be welded to the previous assembly, capturing additional sprockets in a similar manner.

Thus, in the ultrasonically welded joint just described, a common localized portion of two mating segments are melted and deformed such that the segment material flows and welds together in the deformed interface regions 282 and 284. The advantage to this type of assembly is that the carrier 250 may be assembled from individual segments, which are each very simple to mold. While the above-mentioned materials, weld joint and welding technique are particularly adaptable to this type of assembly, alternative materials, weld joints and welding techniques known to industry may potentially be substituted to achieve acceptable results.

Figure 18A:
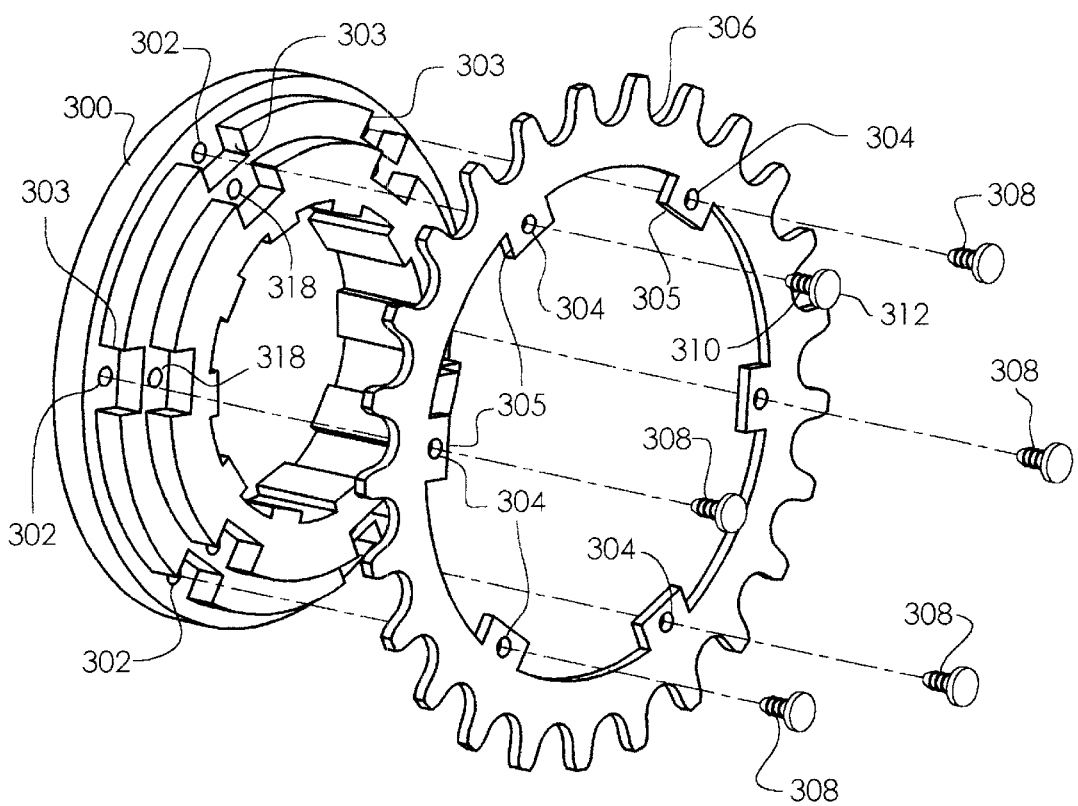
FIG. 18A is an isometric exploded view of an alternate embodiment of the present invention, shown prior to assembly.
Figure 18B:
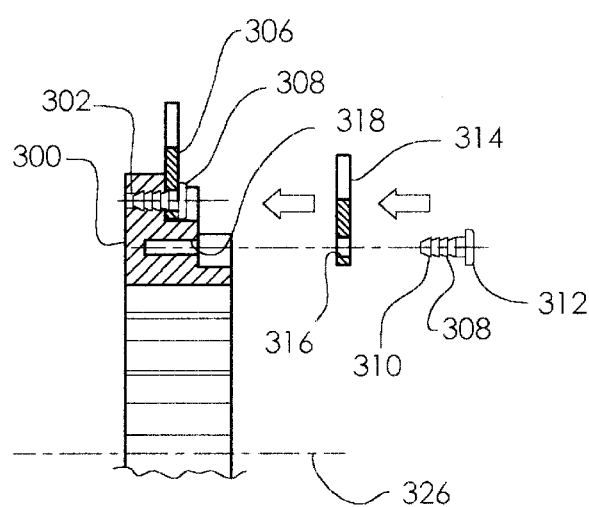
FIG. 18B is a partial axial cross section view of the embodiment of FIG. 18A, shown assembled, including an additional sprocket in exploded view prior to assembly.

As described previously in FIGS. 8A and 8B, the carrier may be a preformed component, where the sprocket is captured and retained to the carrier via localized deformation of the carrier material. Another variation on this theme is described in FIGS. 18A and 18B, which includes a fastener 308 to join the sprocket 306 to the carrier 300. Carrier 300 includes a holes 302, which are sized to be of a slightly smaller diameter in comparison with the outside diameter of ribs 310 of fasteners 308, providing an interference fit therebetween. The sprocket 306 includes holes 304 that are aligned with holes 302 in carrier 300 and are sized to provide clearance with outside diameter of ribs 310. Fastener 308 is passed through corresponding hole 304 and is forced into corresponding hole 302 until the sprocket is firmly sandwiched against the carrier 300 by head 312 of fastener 308 as shown in FIG. 18B. This process is repeated for all fasteners 308. The fasteners 308 are preferably of hard metal such that, as ribs 310 are forced to pass into hole 302, the carrier 300 material surrounding hole 302 is plastically and elastically deformed to conform to the ribs 310 of fastener 308. With fastener 308 fully seated in hole 302, the surrounding carrier 300 material conforms and grips ribs 310, providing resistance to pull-out and firmly anchoring the sprocket 306 to the carrier 300. Additionally, upon assembly, the tabs 305 of the sprocket 306 also engage with mating pockets 303 in the carrier 300 to increase the torque transmission capacity between the sprocket 306 and the carrier 300. Thus, an edge of tab 305 bears against an edge of pocket 303 to provide a blocking engagement between the sprocket 306 and the carrier 300 for transmission of torque between these two elements. As shown in FIG. 18B, the components of FIG. 18A are assembled, with fastener 308 and engaged in hole 302. Additional sprocket 314 is also shown in exploded assembly, including fasteners 308, to pass through holes 316 and engage holes 318. The assembly rotates about rotary axis 326.

While ribs 310 of fastener 308 are shown in the figure to be axially spaced circumferential ribs, it should be noted that a self-tapping screw, with a helical rib, could be substituted for fastener 308 to deform the surrounding carrier 300 material and provide similar function to fastener 308, with the added benefit of allowing the fastener to be unscrewed and removed if desired. Further, an energized ultrasonic welding horn may be utilized to drive fastener 308 into hole 302. Such an ultrasonic insertion, well known in industry, would serve to soften and melt the surrounding carrier 300 material, thereby permitting the carrier material to deform more easily, creating a still firmer connection between fastener 308 and carrier 300. Still further, it should be noted that, as an alternative to ribs 310, a variety of uneven or configured surface patterns may be incorporated into fastener 308 to achieve a similar assembly.

Thus, the present invention provides a sprocket assembly that is lighter in weight, lower in cost, more convenient, and provides greater shifting accuracy. Further, the present invention reduces the amount of heavy steel material in the assembly, reducing weight and raw material cost. Further still, the present invention provides the added convenience of retaining a multiple of sprockets in one integrated assembly. Further still, the present invention provides greater shifting precision by locating the sprockets with greater accuracy to achieve precisely controlled sprocket spacing. Yet further, the present invention allows for a reduced cost by producing two or more sprockets from a single sheet metal blank and by eliminating additional spacer components and by utilizing lower cost carrier materials. Cost may be further reduced through the utilization of a single net shape molding operation, rather than expensive machining operations. Cost may further be reduced and convenience may be enhanced by incorporating additional functions within the assembly.

While the above description contains many specificities, these should not be construed as limitations on the scope of the invention, but rather as exemplifications of embodiments thereof. Many other variations are possible.

For example, it should be noted that the present invention is applicable to a wide range of mechanical power transmission elements, including rotary elements, such as the aforementioned sprocket element, where motion occurs about a rotational axis, as well as linear elements, where motion occurs along a non-rotary path. One example of such a linear power transmission element would include items such as a rack gear, a cam follower, a link, etc.

Further, while the discussion herein focuses on a sprocket-to-roller chain interface for transmission of power, it is understood that a wide variety of alternate interfaces, known to industry, may be substituted. Some of these alternate interfaces may include: frictionally coupled interface, rolling interface, pivoting interface, gear tooth interface, sliding follower interface, belt and pulley interface, bearing interface, etc.

Still further, the preceding description focuses on a simple power transmission element, which includes a single input interface and a single output interface. It should be understood that the present invention is particularly applicable to power transmission elements which include a plurality of output interfaces, each mating with an individual external power transmission element. For example, since the carrier 40 of FIGS. 3A and 3B may be formed in a net-shape molding operation, it would be possible to mold a cam profile surface into the carrier, wherein the cam surface serves to transmit motion to an auxiliary external power transmission element such as a cam follower.

Still further, referring to FIGS. 4A, 4B, 5A and 5B, where inserts 60 and 64 contact an external power transmission element such as the freehub body 4 to distribute the contact forces over a larger area of carrier 40 material, it is envisioned that the use of preformed inserts may similarly be positioned within the carrier 40 to contact the sprocket 36 such that the contact forces between the sprocket and the carrier may be distributed over a larger area of carrier material to reduce contact stress.

It is to be understood that the invention is not limited to the illustrations described and shown herein, which are deemed to be merely illustrative of the best modes of carrying out the invention, and which are susceptible to modification of form, size, arrangement of parts and details of operation. The invention rather is intended to encompass all such modification which are within its spirit and scope as defined by the claims.

What is claimed is:

1. A power transmission assembly, comprising:
   a preformed first portion;
   a second portion, connected to said first portion;
   a first power transmission element;
      wherein said first portion is connected to said second portion via deformation of said second portion,
      and wherein a portion of said first portion is external to said second portion,
      and wherein said external portion contacts said first power transmission element at a first mating interface for transmission of power between said first portion and said first power transmission element, and
      wherein said first portion includes a configured surface, and
      wherein said second portion engages said configured surface.

2. A power transmission assembly according to claim 1, including a second power transmission element, wherein said connected first and second portions contact said second power transmission element at a second mating interface for transmission of power between said connected first and second portions and said second power transmission element.

3. A power transmission assembly according to claim 2, wherein said second mating interface includes contact between said second portion and said second power transmission element.

4. A power transmission assembly according to claim 2, wherein at least one of said first mating interface and said second mating interface includes a mechanically linked blocking interface to eliminate slippage at least at one of said mating interfaces.

5. A power transmission assembly according to claim 2, wherein at least one of said first mating interface and said second mating interface includes a low-friction slipping interface, permitting relative movement in at least one direction of movement of said power transmission assembly.

6. A power transmission assembly according to claim 2, wherein at least one of said first mating interface and said second mating interface includes a frictionally coupled interface at said mating interface.

7. A power transmission assembly according to claim 2, wherein at least one of said first mating interface and said second mating interface is a sliding follower interface.

8. A power transmission assembly according to claim 2, wherein said power transmission assembly is a rotary power transmission assembly which constitutes a generally cylindrical assembly, wherein said first mating interface occurs adjacent the outside diameter of said first portion and wherein said second mating interface occurs adjacent the inside diameter of said second portion.

9. A power transmission assembly according to claim 2, including a rotational axis, wherein said power transmission assembly is a rotary power transmission assembly, including rotation about said rotational axis, and wherein said second mating interface occurs over a greater width, as measured along said rotational axis, than said first mating interface.

10. A power transmission assembly according to claim 2, wherein at least one of said first mating interface and said second mating interface is a low-friction bearing interface.

11. A power transmission assembly according to claim 2, wherein said second portion includes at least one extension and said second mating interface is external to said at least one extension.

12. A power transmission assembly according to claim 2, including at least one preformed insert, wherein said preformed insert is joined to said second portion and wherein said insert contacts at least one of said first power transmission element at said first mating interface and said second power transmission element at said second mating interface.

13. A power transmission assembly according to claim 2, wherein said second mating interface is a keyed engagement.

14. A power transmission assembly according to claim 2, wherein said first portion is isolated from said second mating interface.

15. A power transmission assembly according to claim 2, wherein said second portion includes a bearing surface for at least one of a rolling a d a sliding interface with said second power transmission element.

16. A power transmission assembly according to claim 1, wherein said first portion exhibits higher hardness than said second portion.

17. A power transmission assembly according to claim 1, including a plurality of said first portions.

18. A power transmission assembly according to claim 1, wherein said first power transmission element is a linear power transmission element.

19. A power transmission assembly according to claim 1, wherein said first portion includes a configured surface for engaged mating contact with said first power transmission element at said first mating interface.

20. A power transmission assembly according to claim 1, wherein said first portion connects to said second portion at a multiplicity of connection interfaces, including regions of separation between said first portion and said second portion between said connection interfaces.

21. A power transmission assembly according to claim 1, wherein said second portion includes a softened and malleable state and a hardened state, wherein said deformation occurs during said softened state, such that, said first portion is firmly connected to said second portion in said hardened state.

22. A power transmission assembly according to claim 21, wherein at least a portion of said first portion is secured to said second portion by hardened molding material which is integral with said second portion, including at least a portion of said hardened molding material which is formed to conform to a mold cavity.

23. A power transmission assembly according to claim 21, wherein said first portion includes at least one through opening, and wherein said hardened molding material passes through said through opening and retains said first portion.

24. A power transmission assembly according to claim 1, wherein said second portion is made of polymeric material.

25. A power transmission assembly according to claim 24, wherein said polymeric material is a matrix material which includes at least one of reinforcement fibers and reinforcement particles.

26. A power transmission assembly according to claim 1, wherein said first portion includes a configured surface, and wherein said second portion engages said configured surface for relative slippage control.

27. A power transmission assembly according to claim 1, including a rotational axis, wherein said power transmission assembly is a rotary power transmission assembly, including rotation about said rotational axis.

28. A power transmission assembly according to claim 27, including a multiplicity of said first portions, wherein said multiplicity of said first portions are axially spaced from each other along said rotational axis.

29. A power transmission assembly according to claim 28, wherein at least two of said multiplicity of first portions are fixed to a common second portion.

30. A power transmission assembly according to claim 28, wherein said second portion includes an extension to provide a surface to interact with said first power transmission element to aid in shifting said first power transmission from a first of said multiplicity of said first portions to a second of said multiplicity of said first portions.

31. A power transmission assembly according to claim 27, wherein said first portion includes sprocket teeth and said first mating interface is a sprocket-to-chain mating interface.

32. A power transmission assembly according to claim 27, wherein said first portion includes a plurality of sectors for contact at said first mating interface.

33. A power transmission assembly according to claim 32, wherein at least one of said sectors is integral with said second portion.

34. A power transmission assembly according to claim 27, wherein said first portion includes cog teeth and wherein said first mating interface includes engagement with said cog teeth.

35. A power transmission assembly according to claim 27, wherein said first mating interface is radially outboard of said second mating interface.

36. A power transmission assembly according to claim 1, including at least one hollowed-out region formed within said second portion.

37. A power transmission assembly according to claim 1, wherein said deformation occurs in a localized region of said second portion.

38. A power transmission assembly according to claim 36, wherein said deformation occurs during a softened state in said localized region to facilitate said deformation, such that, upon the subsequent hardening of said localized region, said first portion is connected to said second portion via said deformation.

39. A power transmission assembly according to claim 1, including a plurality of said first portions, wherein said first mating interface contacts each of said first portions independently.

40. A power transmission assembly according to claim 1, wherein said second portion includes at least one extension therefrom for contact with said first power transmission element.

41. A power transmission assembly according to claim 1, including at least one preformed insert joined to said second portion and at least one external auxiliary element, wherein said auxiliary element is connected to said second portion by means of said preformed insert.

42. A power transmission assembly, comprising:
a preformed first portion;
a second portion, connected to said first portion;
a first power transmission element;
wherein said first portion is connected to said second portion via deformation of said second portion,
and wherein a portion of said first portion is external to said second portion,
and wherein said external portion contacts said first power transmission element at a first mating interface for transmission of power between said first portion and said first power transmission element,
including a second power transmission element, wherein said connected first and second portions contact said second power transmission element at a second mating interface for transmission of power between said connected first and second portions and said second power transmission element, and
wherein said second mating interface includes contact between said first portion and said second power transmission element.

43. A power transmission assembly, comprising:
a preformed first portion;
a second portion, connected to said first portion;
a first power transmission element;
wherein said first portion is connected to said second portion via deformation of said second portion,
and wherein a portion of said first portion is external to said second portion,
and wherein said external portion contacts said first power transmission element at a first mating interface for transmission of power between said first portion and said first power transmission element,
including a second power transmission element, wherein said connected first and second portions contact said second power transmission element at a second mating interface for transmission of power between said connected first and second portions and said second power transmission element, wherein said second mating interface includes contact between said second portion a d said second power transmission element, and
wherein said first portion includes at least one extension to contact said second power transmission element at said second mating interface.

44. A power transmission assembly, comprising:
a preformed first portion;
a second portion, connected to said first portion;
a first power transmission element;
wherein said first portion is connected to said second portion via deformation of said second portion,
and wherein a portion of said first portion is external to said second portion,
and wherein said external portion contacts said first power transmission element at a first mating interface for transmission of power between said first portion and said first power transmission element,
including at least one preformed reinforcing element connected to second portion.

45. A power transmission assembly, comprising:
a preformed first portion;
a second portion, connected to said first portion;
a first power transmission element;
wherein said first portion is connected to said second portion via deformation of said second portion,
and wherein a portion of said first portion is external to said second portion,
and wherein said external portion contacts said first power transmission element at a first mating interface for transmission of power between said first portion and said first power transmission element,
including at least one hollowed-out region formed within said second portion, a d including at least one rib, wherein said rib spans across said hollowed-out region to provide structural support.

46. A power transmission assembly, comprising:
a preformed first portion;
a second portion, connected to said first portion;
a first power transmission element;
wherein said first portion is connected to said second portion via deformation of said second portion,
and wherein a portion of said first portion is external to said second port on, and wherein said external portion contacts said first power transmission element at a first mating interface for transmission of power between said first portion and said first power transmission element, including a second power transmission element, wherein said connected first and second portions contact said second power transmission element at a second mating interface for transmission of power between said connected first and second portions and said second power transmission element, including at least one preformed insert, wherein said preformed insert is joined to said second portion and wherein said insert contacts at least one of said first power transmission element at said first mating interface and said second power transmission element at said second mating interface, wherein said insert has greater hardness than said second portion.

47. A power transmission assembly, comprising:
a preformed first portion;
a second portion, connected to said first portion;
a first power transmission element;
wherein said first portion is connected to said second portion via deformation of said second portion,
and wherein a portion of said first portion is external to said second port on,
and wherein said external portion contacts said first power transmission element at a first mating interface for transmission of power between said first portion and said first power transmission element,
including a second power transmission element, wherein said connected first and second portions contact said second power transmission element at a second mating interface for transmission of power between said connected first and second portions and said second power transmission element,
including at least one preformed insert, wherein said preformed insert is joined to said second portion and wherein said insert contacts at least one of said first power transmission element at said first mating interface and said second power transmission element at said second mating interface, wherein said insert has greater hardness than said second portion.

48. A power transmission assembly, comprising:
a preformed first portion;
a second portion, connected to said first portion;
a first power transmission element;
wherein said first portion is connected to said second portion via deformation of said second portion,
and wherein a portion of said first portion is external to said second portion,
and wherein said external portion contacts said first power transmission element at a first mating interface for transmission of power between said first portion and said first power transmission element,
wherein said deformation occurs in a localized region of said second portion, and wherein said deformation results in an overlie engagement to connect said first portion to said second portion.

49. A power transmission assembly, comprising:
a preformed first portion;
a second portion, connected to said first portion;
a first power transmission element;
wherein said first portion is connected to said second portion via deformation of said second portion,
and wherein a portion of said first portion is external to said second portion,
and wherein said external portion contacts said first power transmission element at a first mating interface for transmission of power between said first portion and said first power transmission element,
wherein said deformation occurs in a localized region of said second portion, an wherein said second portion is composed of a plurality of segments, wherein said segments are joined to each other to retain said first portion.

50. A power transmission assembly according to claim 49, wherein said deformation includes welding deformation via the intermingling of adjoining softened surfaces and said segments are joined to each other by a welded connection in at least a portion of said localized region.

51. A power transmission assembly, comprising:
a preformed first portion;
a second portion, connected to said first portion;
a first power transmission element;
wherein said first portion is connected to said second portion via deformation of said second portion,
and wherein a port on of said first portion is external to said second portion,
and wherein said external portion contacts said first power transmission element at a first mating interface for transmission of power between said first portion and said first power transmission element,
wherein said deformation occurs in a localized region of said second portion, including a deforming element to create said deformation and, wherein said deformation of said second portion includes at least one of plastic deformation and elastic deformation to connect to said first portion via said deforming element.

52. A power-transmission assembly according to claim 51, wherein said deforming element includes a configured surface, such that said configured surface creates an interlocked connection between said deforming element and said second portion.

53. A poser transmission assembly according to claim 52, wherein said deforming element is a self-tapping screw.

54. A power transmission assembly, comprising:
a preformed first portion;
a second portion, connected to said first portion;
a first power transmission element;
wherein said first portion is connected to said second portion via deformation of said second portion,
and wherein a portion of said first portion is external to said second portion,
and wherein said external portion contacts said first power transmission element at a first mating interface for transmission of power between said first portion and said first power transmission element,
wherein said deformation occurs in a localized region of said second portion, and wherein said first portion includes at least one edge and wherein said second portion includes at least one edge, and wherein said edge of said first portion is engaged with said edge of said second portion to provide interconnection between said first portion and said second portion.

55. A power transmission assembly, comprising:
a preformed first portion;
a second portion, connected to said first portion;
a first power transmission element;
wherein said first portion is connected to said second portion via deformation of said second portion,
and wherein a portion of said first portion is external to said second portion,
and wherein said external portion contacts said first power transmission element at a first mating interface for transmission of power between said first portion and said first power transmission element, wherein said first mating interface includes contact between said first power transmission element and said second portion simultaneous to said contact between said first portion and said first power transmission element.

56. A power transmission assembly, comprising:

a preformed first portion;

a second portion, connected to said first portion;

a first power transmission element;

wherein said first portion is connected to said second portion via deformation of said second portion, and wherein a portion of said first portion is external to said second portion, and wherein said external portion contacts said first power transmission element at a first mating interface for transmission of power between said first portion and said first power transmission element, including a second external power transmission element, wherein said connected first and second portions contact said second power transmission element at a second mating interface for transmission of power between said connected first and second portions an said second power transmission element, wherein said second power transmission element is removably assembled with said second portion at said second mating interface.

* * * * *